No. 887,356. PATENTED MAY 12, 1908.
J. L. STRAUB.
BALL BEARING.
APPLICATION FILED NOV. 14, 1906.

Witnesses

Inventor
J. L. Straub
By Julian C. Dowell
his Attorneys

UNITED STATES PATENT OFFICE.

JACKSON L. STRAUB, OF LANCASTER, PENNSYLVANIA, ASSIGNOR OF ONE-HALF TO ERNST SACHS, OF SCHWEINFURT-ON-THE-MAIN, GERMANY.

BALL-BEARING.

No. 887,356.   Specification of Letters Patent.   Patented May 12, 1908.

Application filed November 14, 1906. Serial No. 343,414.

*To all whom it may concern:*

Be it known that I, JACKSON L. STRAUB, a citizen of the United States, residing at Lancaster, in the county of Lancaster and State of Pennsylvania, have invented certain new and useful Improvements in Ball-Bearings; and I do hereby declare the following to be a full, clear, and exact description of the invention, such as will enable others skilled in the art to which it appertains to make and use the same.

This invention relates to annular ball bearings, comprising concentric bearing-rings or annular members with interposed balls running in confronting grooves therein.

The invention consists of an improved means or device for separating and spacing the balls.

Ball separators for such annular bearings usually comprise several parts arranged between the balls or surrounding them at opposite sides, and secured together by fastenings or having other means for keeping the ball-separator in place. These devices are troublesome to manufacture accurately, and troublesome to arrange in the bearing. Moreover, many of these ball-separators space the balls at considerable distances apart, thus materially diminishing the capacity and strength of the bearing.

The principal objects of this invention are, first, to provide a ball separator of very simple, inexpensive design, which can be effectively made as a one-piece article (although it may also be made in segments), and which can be readily arranged with the balls in the bearing and held therein by the balls themselves, without the need of any fastenings or other retaining means; and, further, to provide a ball-separator which will effectively reduce friction, promote free running of the balls, and permit the use of a relatively large number of balls, or nearly the full number of balls which the bearing is capable of holding.

Figure 1:
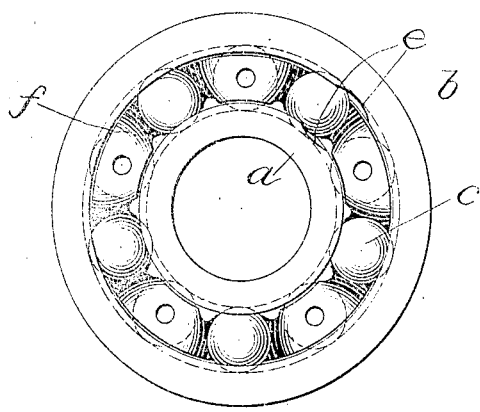
Figure 2:
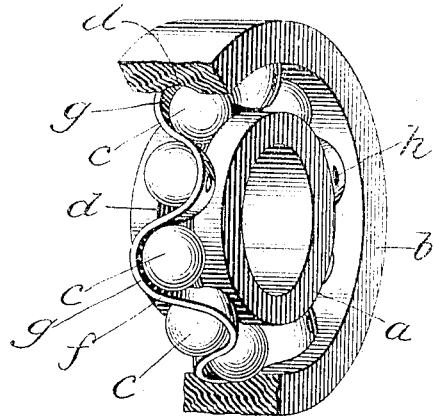
Figure 3:
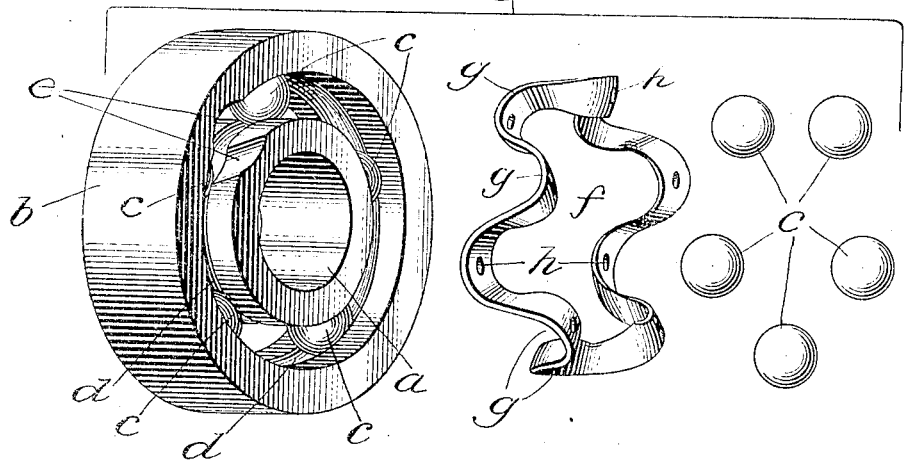
Figure 4:
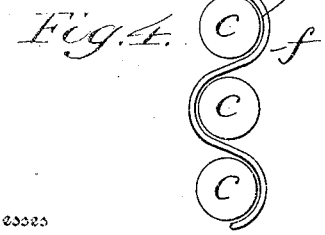
Figure 5:
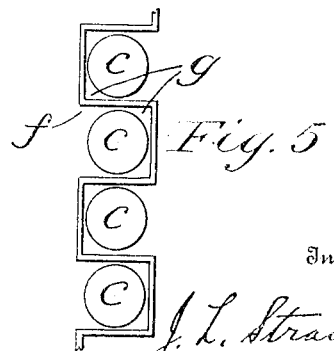

An exemplification of the invention is illustrated in the accompanying drawings, forming a part of this specification, wherein:

Figure 1 is a side view of an annular ball-bearing having my improvement embodied therein; Fig. 2 is a perspective view of the same, with a portion of the outer ring broken away to expose the balls and separator-ring; Fig. 3 is a collective view in perspective of the following named parts unassembled, to wit: first, the bearing proper, with only half of its regular number of balls shown arranged substantially equidistant; second, the separator-ring about to be introduced between the bearing-rings, so that alternate crimps or undulations of said separator-ring will come over the respective balls in the bearing, while the intermediate undulations will go between the balls; and third, the remaining half number of balls which go into the bearing after the separator-ring is assembled therein; Fig. 4 is a diagrammatic view representing a development of a fragment of the ball-separator; Fig. 5 is a similar view showing a modification of the ball-separator.

In the drawings, I have represented my invention embodied in a Fichtel and Sachs bearing (exhibited in United States patent to Ernst Sachs, No. 796,871, dated August 8, 1905), such as may be fitted or arranged between a shaft and its journal-box or between a spindle and the hub of a wheel.

As shown, the ball-bearing comprises the concentric inner and outer bearing-rings $a$ and $b$, with an interposed row of balls $c$, which run in confronting grooves $d$ in the adjacent perimeters of said bearing-rings. The balls may be introduced in any suitable manner, as through a passage in the side of the bearing afforded by a lateral notch or notches $e$. In the illustrated bearing, these notches $e$ provide a spiral or oblique passage to the ball-race or grooves $d$, into which the balls are inserted by forcing them under pressure through said oblique passage $e$, while turning the rings $a$ and $b$ in opposite directions; as explained in the specification of the aforesaid Sachs patent. It is understood, however, that the present invention can be used in different species of ball-bearings, having various means to permit insertion and removal of the balls; the invention being independent of the special means employed for that purpose.

The ball-separator comprises a ring or annulus $f$, of crimped or sinuous form, providing pockets $b$ for the balls $c$ in its opposite faces in alternation. Said ball-separator $f$ is arranged in the annular space or interstice between the bearing-rings $a$ and $b$, being of suitable size to set therein, and passes alternately inward and outward between adjacent balls and around their opposite sides, but without binding; so that one-half of the whole number of balls is exposed at each side of the bearing. The crimps g of the separator-ring, are, of course, made of sufficient depth to loosely encircle the balls, all of which lie in the same plane; and said crimps are preferably even in number, and approximately equal in size; and they are or may be also formed substantially radially with respect to the center of the bearing. The said separator-ring f may be made of metal, as steel or brass, or other suitable material, as celluloid or fiber; and it may be pressed, stamped, cast or machined. Preferably, it is stamped from sheet-metal, by crimping or fluting a flat sheet-metal annulus or washer; the latter being of requisite size to reduce by the crimping operation to a proper degree to fit or set in the annular interstices between the bearing-rings. Moreover, said separator-ring may be made in various forms, either with rounded crimps as in Figs. 1 to 4 inclusive, or with square or angular crimps as in Fig. 5; or the separator may be substantially zig-zag or have other appropriate form embodying the principle herein set forth.

To assemble the balls c and separator-ring f in the bearing, one-half of the whole number of balls are first introduced and placed approximately equidistantly, as shown in Fig. 3. This can be done by the well-known method of displacing the bearing-rings a and b eccentrically, then inserting the balls between them, and then arranging the balls at approximately equal distances apart, so as to bring the bearing-rings a and b again into concentric position. Next, the separator-ring f is placed between the bearing-rings, so that its alternate crimps pass between the adjacent balls, which are thus respectively distributed in the pockets or cavities g therefor in one side of said separator. The remaining half number of balls are finally introduced by inserting them one after another through the lateral passage or notches e, the separator-ring f being moved to bring the pockets in its other side or face successively into position to receive the balls as they are successively introduced between the bearing-rings. When thus assembled, the separator-ring f is held in position by the balls themselves engaging its opposite sides. With this simple device, a greater number of balls can be put into the bearing than is possible with the majority of other spacing devices, since the crimps or sinuations of the separator-ring are or may be so closely arranged as to space the balls only at slight distances apart, while yet leaving sufficient play or clearance around the balls to enable them to run freely. Thus a large capacity of the bearing is obtained. It is possible, especially when the separator-ring is made of sheet-metal, to form its crimps so as to separate adjacent balls only by approximately the thickness of the sheet-metal ring, thereby enabling the bearing to be filled up with the full number of balls, less one, which the bearing-rings can accommodate between them; although in practice it may be desirable to use a lesser number of balls, making the crimps of the separator less pronounced, and leaving more play or clearance for the balls in their respective sockets.

Moreover, the separator-ring, by spacing the balls apart, effectively diminishes friction, the balls being loosely held in their sockets, making practically a two-point contact bearing; that is each ball has its bearings practically in the grooves or ball-races d of the bearing-rings, although the balls may contact more or less with the separator-ring. Thus a very free and easy running bearing is obtained. The separator-ring f revolves with the bearing balls.

To effect removal of the balls, little holes or apertures h are made in the crimps of the separator-ring, just behind the respective ball-cavities, to permit driving out the balls through the lateral passage or notches e by means of a punch. In some kinds of bearings, the punch-holes h may not be necessary, as, for example, where the bearing is provided with a filling-aperture to allow insertion of the balls, closed by a detachable plug to prevent the balls from dropping out. But in the bearing illustrated, as well as in other species of bearings, the punch-holes are or may be necessary.

I claim as my invention and desire to secure by Letters Patent:

1. In a ball-bearing, concentric bearing-members having confronting grooves or ball-races, an annular series of balls running therein, and a ball-spacer or separator consisting of an undulated ring of sheet-metal passing in and out between adjacent balls throughout the series and having the balls seated alternately in the pockets of the two sides of the ring formed by the concavities of the undulations themselves.

2. A ball-spacer consisting of an undulated sheet-metal ring adapted to pass between and receive in the pockets of its two sides successive balls of a series.

3. In a ball-bearing, concentric bearing-members having confronting grooves, an annular row of balls running therein, all in the same plane, and a ball-separator consisting of a ring or annular strip of flat metal of crimped or sinuous form arranged in the space or interstice between the bearing-members and passing alternately inward and outward between adjacent balls and loosely around the same at opposite sides of the bearing, exposing at each side of the bearing one-half of the whole number of balls, the latter being seated in the pockets afforded by the crimps of said separator.

4. A ball-bearing comprising concentric bearing-rings having confronting grooves or ball-races, interposed balls, said rings having in their confronting surfaces a lateral passage for introducing the balls, and a ball-separator arranged in the interstice between the bearing-rings comprising a crimped or undulating annular strip of flat metal loosely inclosing opposite sides of adjacent balls, the summits of the crimps or undulations of said annular strip being provided with punch-holes for forcing out the balls, substantially as described.

5. A ball-separator for annular ball-bearings comprising a ring or annulus in the form of an undulated strip of flat material, providing pockets in its opposite faces in alternation to receive and loosely confine the adjacent balls of an annular series of balls of less diameter than the depths of such pockets and disposed in the same plane.

In testimony whereof I affix my signature, in presence of two witnesses.

JACKSON L. STRAUB.

Witnesses:
CHARLES H. TUCKER,
CHRISTIAN KROEGER.